June 11, 1963 G. RYAN ETAL 3,093,093
APPARATUS FOR SHAPING EDIBLE PRODUCTS
Filed May 20, 1960 3 Sheets-Sheet 1

INVENTORS
Genevieve Ryan &
BY Ronald T. Cox
Helen Stough
ATTORNEY.

June 11, 1963  G. RYAN ETAL  3,093,093
APPARATUS FOR SHAPING EDIBLE PRODUCTS
Filed May 20, 1960  3 Sheets-Sheet 2

INVENTORS
Genevieve Ryan &
Ronald T. Cox
BY
Helen Hough
ATTORNEY

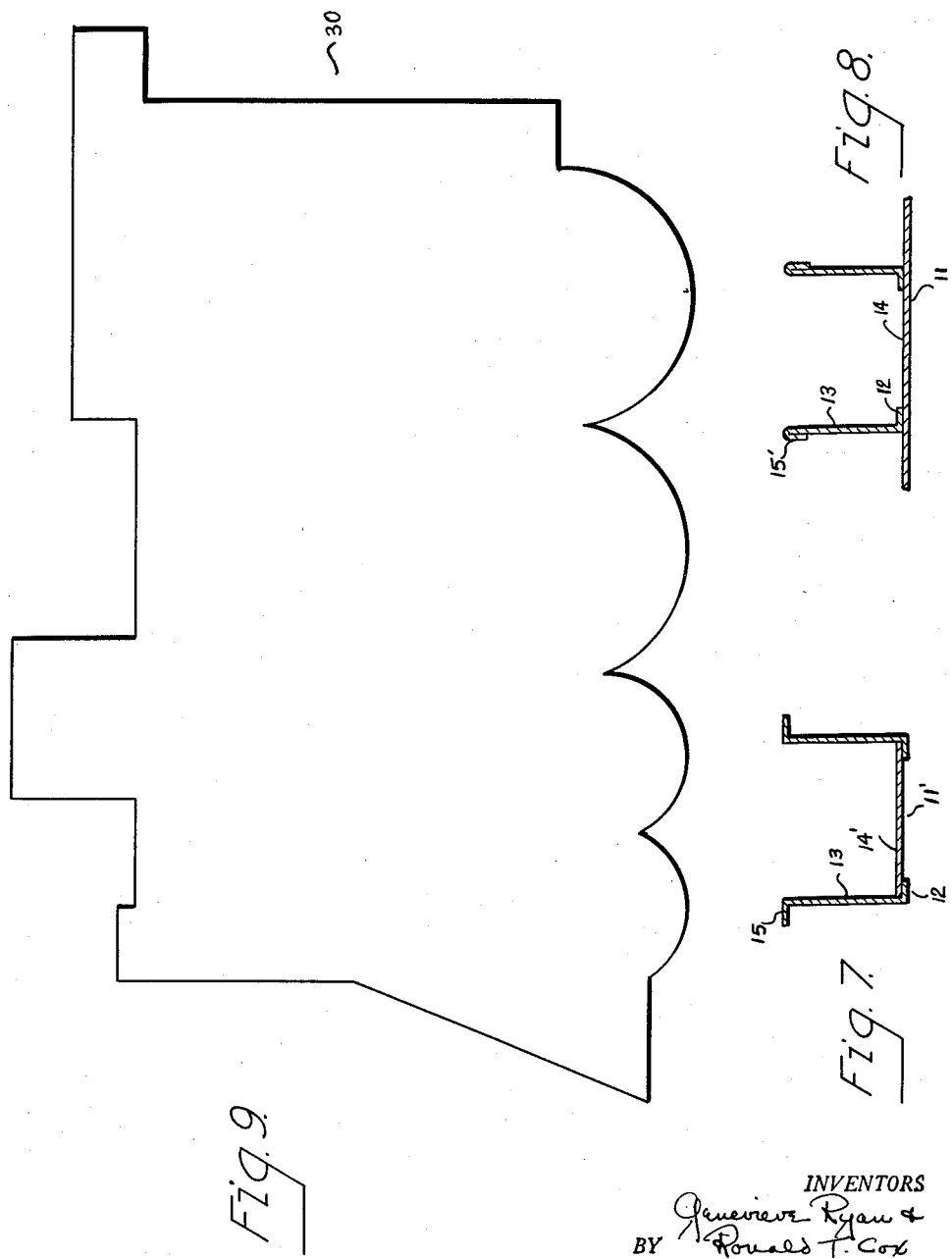

3,093,093
APPARATUS FOR SHAPING EDIBLE PRODUCTS
Genevieve Ryan, 3289 Avalon Drive, Shaker Heights, Ohio, and Ronald T. Cox, 157 Moorewood Road, Avon Lake, Ohio
Filed May 20, 1960, Ser. No. 30,510
3 Claims. (Cl. 107—19)

Our invention relates to an apparatus for shaping edible products and relates more particularly to means for forming such edible products into a variety of contours resulting preferably in numerically-shaped products, as for example "1," "2," "3," "4," or other numerical symbol for use in making birthday or anniversary cake, etc., or other special forms, such as toys, animals or other figures.

A raw edible product, such as cake batter, etc., is preferably placed within the open mold of our invention which is preferably formed in figure outline, and disposed upon a substantially planar surface, such as a baking tin, a cake pan, or like surface, and the mold constitutes the plastic containing or predetermined circumscribed limits for the product and defines the final outline of such product when the same has solidified, as by baking, freezing, etc., into its final form-retaining shape.

An object of our invention is to provide apparatus with which edible products of the type referred to can be easily and efficiently made.

Another object of our invention is to provide apparatus which can be adapted for use with existing baking or other utensils and which can be fluid sealed therewith, of form-sustaining shape, firmly resisting displacement during baking or other form-solidifying process.

A still further object of our invention is to provide apparatus which can be easily cleaned, assembled and dis-assembled, and which can be easily removed from any preferred base and from the solid edible product formed therein.

Other objects of our invention and the invention itself will become more readily apparent by reference to the following description and appended drawings forming a part thereof, in which:

FIG. 7 is a sectional view of the mold, similar to that of FIG. 3, but showing the use of a flat bottom liner therewith;

FIG. 8 is a sectional view similar to that of FIG. 3 but showing a modification of the mold of our invention;

FIG. 9 is a top plan view of a further modification of the mold of our invention.

Figure 1:
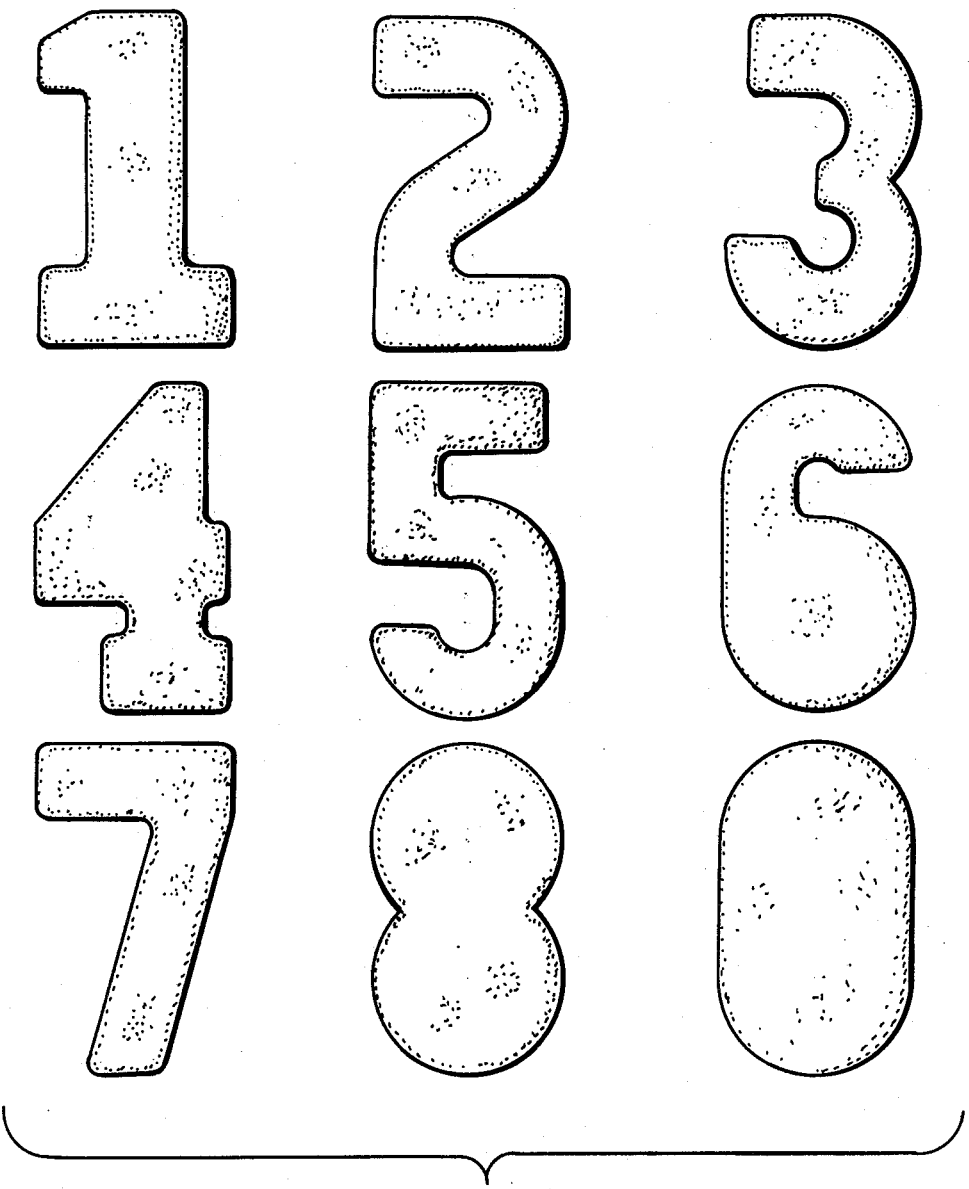
FIG. 1 is a plurality of plan views of finished products which have been given preferred different numerical outlines.
Figure 2:
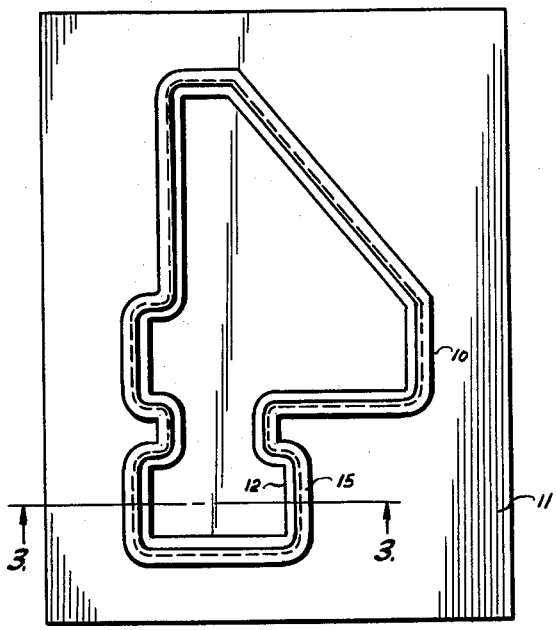
FIG. 2 is a top plan view of a preferred mold of our invention having a number "4" outline inverted as for baking or freezing upon a flat surface element.
Figure 3:
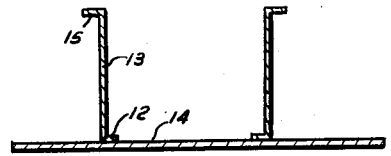
FIG. 3 is a sectional view take on the line 3—3 of FIG. 2.

Referring now to the drawings in each of which like parts are designated by like reference characters, in FIG. 1, we have shown a plurality of cakes bearing numerical outlines "1, 2, 3, 4, 5, 6, 7, 8, 0" (the "6" being reversed to form a "9" if desired) formed by molds of the type shown in the "4"-shaped mold shown in FIGS. 2 to 6 inclusive.

We have illustrated the mold 10 of our invention in FIGS. 2 to 6 as applicated to the numerical form "4," and it is preferably formed of a light weight metal, such as aluminum foil, or the like. We have shown the mold placed on a flat baking tin 11 in inverted form in FIG. 2 in which position an inwardly extending peripheral flange or bead 12 thereof disposed substantially at right angles to the vertically disposed sides 13 of the mold is seated flush with an upwardly facing flat surface 14 of the tin 11, or an upwardly facing flat surface 14' of a specially constructed tin bottom 11', as shown in FIG. 7. An outwardly extending peripheral flange or bead 15 is preferably disposed at right angles to the sides 13 of the mold 10 and surrounds the upwardly positioned edge of the mold in the forms of FIGS. 3, 7, 9. The flange or bead may be, in certain embodiments of our invention as shown in FIG. 8 at 15', bent inwardly or outwardly of the sides 13 and be formed flush therewith. Because of the preferred lightness of the metal of the mold, the flanges or beads 12 and 15 act as reinforcements for the side walls 13, as weighting therefor, and maintain the mold in its preformed shape during baking.

Cake batter or other comestibles of fluent form are next poured into the mold; the peripheral surfaces 12 sealing the mold against egress of the batter, etc. therefrom as well as reinforcing the sides, preventing distortion thereof, in combination with the oppositely disposed flange or bead 15, during baking, wherefore the mold is form-sustaining and the finished product or cake having a predetermined outline, as in the example given, is formed.

Figure 4:
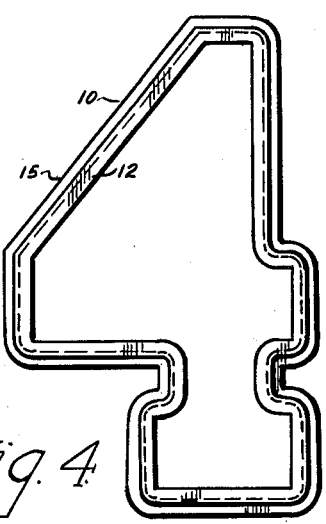
FIG. 4 is a view of the mold of FIG. 2 in upright position, for removal of the contents outlined thereby during baking, etc.

After baking, the form is inverted, as shown in FIG. 4, the flange or bead 15 in the form of FIGS. 2 to 6 inclusive now forms a flat seat for the mold and extends outwardly of the formed cake and the flange or bead 12 now rests upon the peripheral upper edges of the cake wherefore the mold may be raised from the cake by lifting the same by means of the flange or bead 12, and because of the lightness of the metal, the sides may be drawn outwardly of the contents and thus any bond is broken which might exist between the sides 13 and the product, and an unribbed or ungrooved cake having flat upper and lower surfaces conforming to the outline of the figure, as shown in FIG. 1, results.

Figure 5:
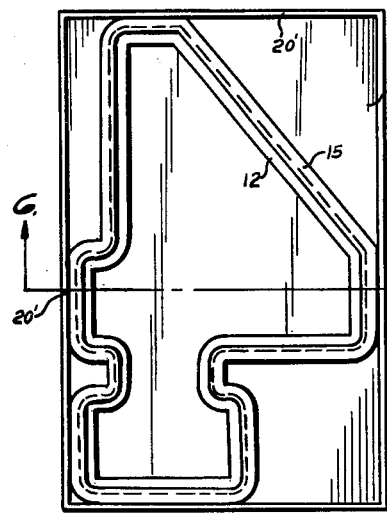
FIG. 5 is a view similar to that of FIG. 2 showing the mold having a "4" numerical outline inverted within a cake pan.
Figure 6:
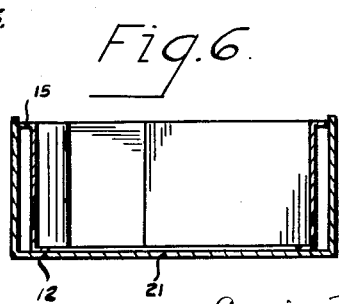
FIG. 6 is a view taken on the line 6—6 of FIG. 5.

In the form of our invention shown in FIGS. 5 and 6, it will be observed that the peripheral edges 15 of the improved mold of our invention as shown for baking in a conventional cake pan 20 are adapted to extend outwardly of the mold 10 to contact the inner sides 20' of the said pan, and the flange or bead 12 seats flush with the bottom 21 of the said cake pan.

In the form of our invention shown in FIG. 9, the outline conforms to the shape of a toy train and the construction of the mold is as shown in the modifications herein described. In other words, the toy train of the form of FIG. 9 is formed of a continuous band of light weight material of substantial depth and said band is provided with an outwardly extending flange about one periphery thereof and with an inwardly extending flange about the opposite periphery, and is adapted to be used in the same manner as the forms of FIGS. 1–8 inclusive.

It will be obvious from the foregoing description and from the drawings that the molds may be used for forming gelatinous forms, or for freezing other comestibles; that in fact cakes baked in such molds may be left therein and frozen for later use, the mold serving as a container therefor for wrapping, etc.

It will further be obvious that other outlines than those illustrated, such as figures of animals, etc., could be used, without departing from the spirit of our invention or the scope of the appended claims.

What we claim is:

1. A form for shaping comestibles comprising a continuous band of light weight metal, said form having substantial depth, said band being provided with an outwardly extending flat peripheral flange and an inwardly extending opposite flat peripheral flange portion, said peripheral portions reinforcing a major vertically extending portion of the continuous band which constitutes the side walls of the form, said peripheral flanges extending substantially perpendicularly to said major vertically extending portion, the said walls being of a predetermined form to produce a desired external form sustaining shape to material disposed therein in fluent form after said fluent material has set within the form, said inwardly extending flange being positioned on the bottom of said form and said outwardly extending flange being positioned on the top of said form during pouring and processing of the fluent material.

2. A form for shaping comestibles comprising a continuous band of light weight metal, said form having substantial depth, said band being provided with an outwardly extending flat peripheral flange and an inwardly extending opposite flat peripheral flange portion, said peripheral flange portion, said peripheral portions reinforcing a major vertically extending portion of the continuous band which constitutes the side walls of the form, said peripheral flanges extending substantially perpendicularly to said major vertically extending portion, the said walls being of a predetermined form to produce a desired external form sustaining shape to material disposed therein in fluent form after said fluent material has set within the form, said inwardly extending flange being positioned on the bottom of said form and said outwardly extending flange being positioned on the top of said form during pouring and processing of the fluent material, said form adapted to be reversely positioned for removal of the contents wherefore said inwardly extending flange will rest flat on the top of the form sustaining comestible after processing and the outwardly extending flange will project outwardly therefrom for easy removal of the mold from the final product.

3. A form for shaping comestibles comprising a continuous band of light weight spring like metal, said form having substantial depth, said band being provided with an outwardly extending flat peripheral flange and an inwardly extending opposite flat peripheral flange portion, said peripheral portions reinforcing a major vertically extending portion of the continuous band which constitutes the side walls of the form, said peripheral flanges extending substantially perpendicularly to said major vertically extending portion, the said walls being of a predetermined form to produce a desired external form sustaining shape to material disposed therein in fluent form after said fluent material has set within the form, said inwardly extending flange being positioned on the bottom of said form during pouring and processing of the fluent material, said form adapted to be reversely positioned for removal of the contents wherefore said inwardly extending flange will rest flat on the top of the form sustaining comestible after processing and the outwardly extending flange will project outwardly therefrom for easy removal of the mold from the final product, by exerting outward and upward manual pressure on the outwardly extending flange resiliently drawing the walls outwardly of the form sustaining comestible.

References Cited in the file of this patent

UNITED STATES PATENTS

| | | |
|---|---|---|
| 1,361,081 | Mackinnon | Dec. 7, 1920 |
| 1,478,801 | Slye | Dec. 25, 1923 |
| 1,531,109 | Lemmon | Mar. 24, 1925 |
| 2,015,097 | Bowman et al. | Sept. 24, 1935 |
| 2,030,642 | Kremmling | Feb. 11, 1936 |
| 2,283,380 | MacManus | May 19, 1942 |
| 2,495,469 | Nafziger | Jan. 24, 1950 |
| 2,539,917 | McKinley | Jan. 30, 1951 |

FOREIGN PATENTS

| | | |
|---|---|---|
| 398,493 | France | Mar. 24, 1909 |